Patented Oct. 15, 1940

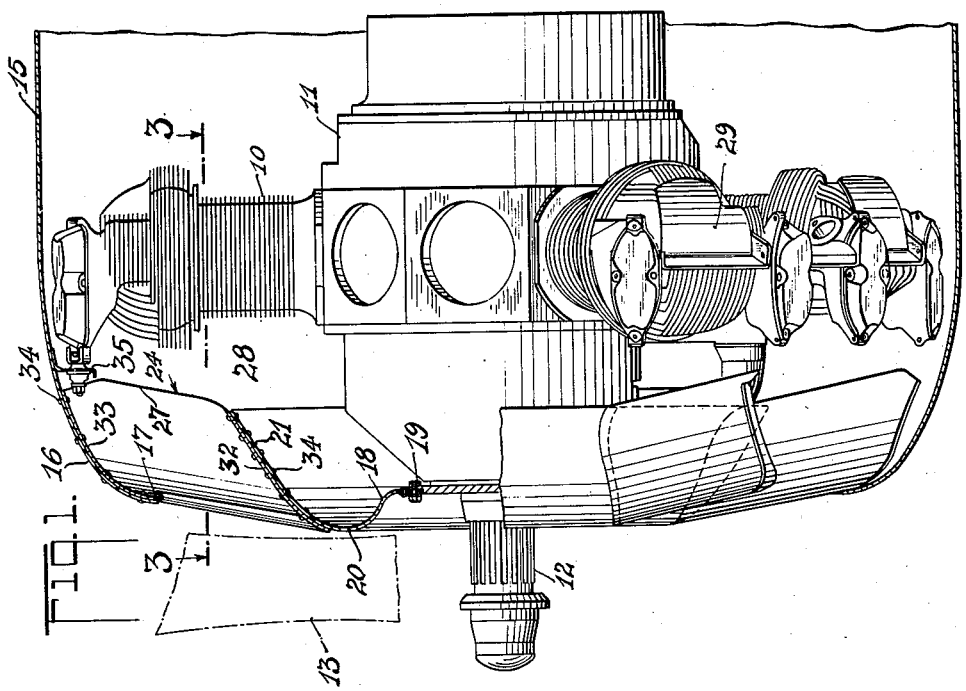
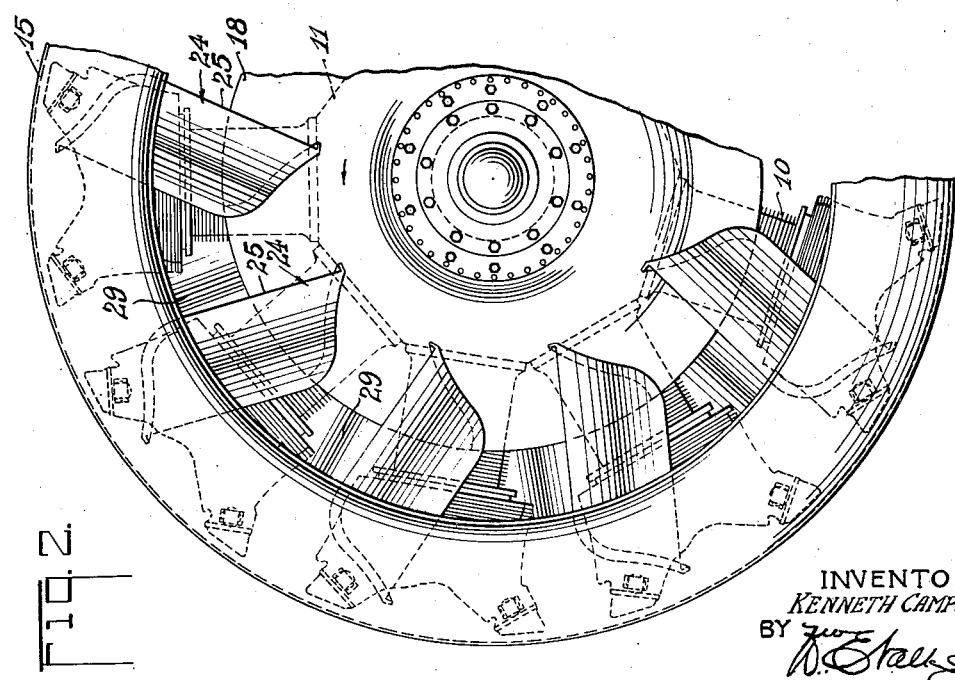

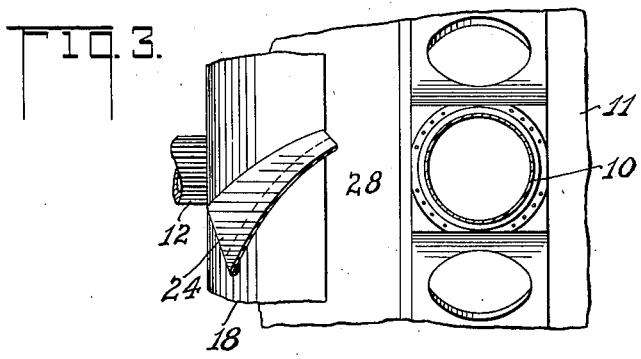
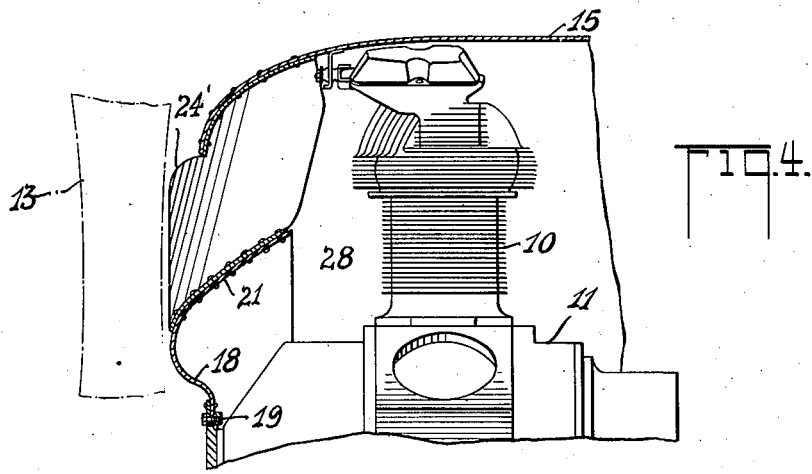
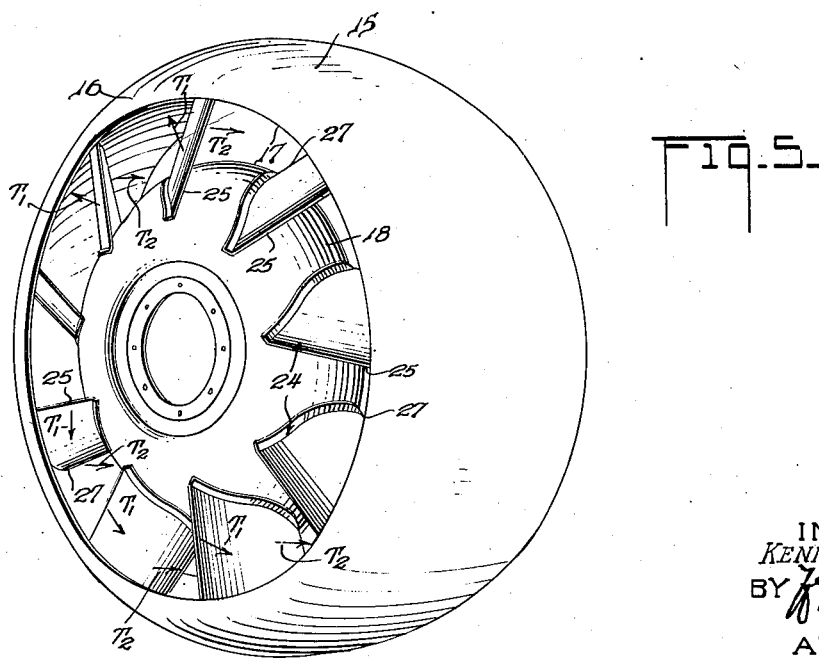

2,217,858

UNITED STATES PATENT OFFICE 2,217,858

COWLING FOR RADIAL AIRCRAFT ENGINES

Kenneth Campbell, Radburn, N. J., assignor to Wright Aeronautical Corporation, a corporation of New York Application April 12, 1938, Serial No. 201,471

7 Claims. (Cl. 123—171)

This invention relates to the cooling and cowling of aircraft engines and is concerned particularly with improvements applicable to radial cylinder air-cooled engines and the effective cowling thereof to assure adequate cooling.

The prior art has effectively taught the use of annular cowlings embracing a radial cylinder engine by which the drag of the engine is materially reduced, with the aid of baffles between the engine cylinders confining cooling airflow to the finned peripheries of the cylinder; and likewise has taught that engines may be effectively cooled though they be confined within a cowling. In installations of this character, the cowling extends forwardly of the engine disc and is inturned at its leading edge to define an air entrance opening rearward of a propeller mounted on the engine and ahead of the cowling. It has been found that the front sides of the engine cylinders are always effectively cooled, and that the rear sides of the cylinders are only effectively cooled when proper inter-cylinder baffles are used and when the pressure difference between the front and back sides of the cylinders is great enough to assure a substantial airflow between the cylinders and baffles. The maintenance of this pressure differential under all conditions of airplane operation is essential but, with the conventional type of cowling, it has been found difficult to maintain the differential under conditions of engine operation wherein the air speed of the aircraft is low. It will be appreciated that that part of the propeller forward of the cowl air entrance opening is relatively ineffectual in building up a pressure head within the nose of the cowling, the butt portions of the propeller blades being nearly cylindrical and having little or no pitch effect. The flow of air leaving the propeller at low air speeds is primarily radial and tangential in its direction, and a high degree of turbulence exists within the cowl nose by which the front sides of the cylinders are adequately cooled. If the general direction of the flow of air be converted to axial, from the tangential and radial flow, the pressure head in front of the engine is increased and the cooling air pressure differential across the engine is improved so that the engine may properly cool under low air speed conditions. The cooling problem is not difficult under conditions of normal cruising or high speed flight since then, the component of axial air flow due to flight speed is sufficient to build up the desired cooling pressure differential, and the general turbulence in front of the engine persists to cool the front sides of the cylinders.

Another limitation of the conventional open front cowl is that when the aircraft is in a high angle of attack, low speed attitude, cooling air tends to spill from the top of the cowl entrance, reducing the static pressure within the cowl nose at the top of the cowl with consequent reduction in the cooling pressure differential and overheating of the top cylinders.

It is an object of this invention to provide means for assuring an adequate cooling pressure differential under all conditions of air speed of the aircraft. A further object is to provide means for guiding the air entering the cowling in such a manner as to effectively control the airflow velocity by which a static pressure head is built up within the cowl nose. A further object is to provide means for converting the mass flow of air from a radial and tangential direction to a substantially axial direction, and to provide an air reservoir immediately ahead of the engine in which a static air pressure head may be developed for cooling all parts of the engine cylinders. These objectives are obtained while still allowing a high degree of fine grained turbulence in the cooling air whereby the front sides of the cylinders are effectively cooled during all flight regimes, but the general mass of air is so directed as to provide the high pressure differential between the front and rear of the engine which is the criterion for adequately cooling the rear sides of the engine cylinders.

Although the above gives a general view of the objectives of the invention, the annexed detailed description in connection with the drawings will give a clearer understanding. In these drawings:

Fig. 1 is a sectional elevation of a cowling according to the invention, showing the disposition of the engine therewithin;

Fig. 2 is a front elevation of the cowled engine;

Fig. 3 is a section on the line 3—3 of Fig. 1;

Fig. 4 is a fragmentary section through an alternative form of cowling; and

Fig. 5 is a quartering front perspective view of the cowling showing the airflow directions.

The drawings indicate an air-cooled radial cylinder engine comprising finned cylinders 10 radially mounted upon a crankcase 11 from the forward end of which a propeller shaft 12 extends. A portion of one of the propeller blades is diagrammatically indicated at 13, the propeller being mounted upon the shaft 12 in the conventional manner. An annular cowling 15 embraces the engine, this cowling being inturned at its forward portion 16 to define at its leading edge 17 a substantially circular air entrance opening. It will be understood that air exit openings are provided in the cowling downstream relative to the engine cylinders. Upon the front section of crankcase 11, a dished member 18 is attached as at 19, this member, from its innermost edge, first extending forwardly and outwardly to a point close to the trailing edge of the propeller, as at 20, and thence, the member 18 slopes outwardly and rearwardly as at 21 so that, with the leading edge 17, it defines an air entrance annulus the dominant direction of which slopes radially outwardly. Between the cowl nose 16 and the portion 21 of the member 18 are circumferentially disposed a plurality of curved vanes 24, the particular disposition of these vanes forming an important part of the invention. As will be seen in Fig. 2, the leading edges 25 of the vanes are angularly offset from a radial line through the propeller shaft center, whereby each leading edge 25 is, in effect, perpendicular to the direction of local airflow attacking same. As above indicated, the propeller produces substantial radial and tangential movement of the air entering the cowling. Any air particle leaving the propeller will leave substantially at a tangent thereto but since a certain amount of space is necessary between the propeller trailing edge and the leading edge 25 of the vane, the position of said leading edge is so adjusted as to be normal to the path of such an air particle as it travels from the propeller plane to the plane of the vane leading edge. The vanes, as indicated in the drawings and particularly in Figs. 3 and 5, are curved in profile, a tangent $T_1$ to the leading edge of each, normal to the leading edge, being substantially coincident with the average path of an air particle leaving the propeller under low flight speed conditions. The profile of the vane is then curved toward an axial direction so that a tangent $T_2$ to the vane trailing edge is very nearly parallel to the propeller shaft axis. Thus, air particles attacking the vanes 24 will be diverted from their tangential and radial movement to an axial movement directly toward the engine cylinders.

Since the air entering the cowl nose has a substantial velocity head, it is desirable to convert this as much as possible to pressure head while still permitting of local turbulence for cooling the front sides of all portions of the cylinders. Accordingly, the vanes 24 terminate a definite distance ahead of the engine, providing between the trailing edges 27 of the vanes, and the fronts of the engine cylinders 10, a space 28 within which cooling air may be entrained and within which space a considerable amount of local turbulence takes place for cooling the front sides of the cylinders. It will be appreciated that although the substantial static pressure head is desirable in the space 28 to provide for cooling of the rear parts of the cylinders by inducing airflow between baffles 29 and the finned portions of the cylinders, the air in the space 28 is by no means static. Under any circumstances it has turbulence, velocity head, and pressure head. The effective cooling of the engine under all operating regimes is produced by an appropriate adjustment of these characteristics whereby adequate cooling of the engine is assured with a minimum of airflow through the engine disc.

The vanes above described will go far toward accomplishing the objectives indicated, particularly at low air speed conditions which are critical. The use of the vanes in an actual reduction to practice shows a 250% increase in baffle pressure differential during ground running of an engine at 1800 R. P. M. The vanes likewise, tend to prevent the recirculation of cooling air entrained within the cowl nose under climbing conditions of an aircraft, maintaining the baffle pressure differential at the top of the cowling in the climbing condition, which differential is substantially reduced when the vanes are not utilized.

In the high speed flight regime, axial airflow into any cowl due to airspeed causes a considerable pressure to build up in the cowl nose and with conventional cowling, it has sometimes been necessary to damper the airflow through the cowling to prevent excessive drag and overcooling of the engine, or conversely, to enlarge the exit opening at low speed to permit passage of sufficient air for cooling. The use of the vanes of this invention, with a restricted air exit, will tend to automatically maintain effective engine cooling in both the high and low speed flight regimes without the use of adjustable cowl flaps or controllable dampers. The air entering the cowling during high speed operation is relatively unaffected by the presence of the vanes in the airstream, since the airflow has a material axial component. But during low speed operation, when the tangential flow into the cowling becomes predominant, the vanes function without need for adjustment, to change its direction and to increase the pressure within the cowl nose to the extent necessary to maintain the proper pressure drop across the engine, without any need for enlarging the cowl exit or artificially forming a zone of extreme low pressure at the cowl exit. Thus a fixed cowl exit may be designed for proper engine cooling and low drag at cruising speeds, and the vanes in the cowl nose maintain the proper cooling pressure differential at low speeds.

It is desirable to so dispose the vanes 24 that they lie close to the propeller blades to prevent undue loss of airflow therebetween. In the case of a controllable pitch propeller, the vane leading edges must lie rearwardly of the feathering position of the propeller blade trailing edges and it is for this reason that there is a gap in Fig. 1 between the propeller blade 13 and the vane leading edge 25. When fixed pitch propellers are utilized as in Fig. 4, the leading edge of the vane may be extended forwardly as shown at 24' so that it lies closely adjacent the trailing edge of the propeller 13'.

The member 18 shown in the drawings has primary utility in providing a structural anchorage for the inner parts of the vanes 24 as well as masking the propeller hub. However, this member 18 does not form an essential part of the invention if adequate structural provisions may be made otherwise to hold the inner ends of the vanes 24. As shown, the inner and outer ends of the vanes are flanged as at 32 and 33, respectively, and are secured to the member 18 and to the cowl nose 16 as at 34 although the vanes may be carried by structure independent of the cowl. The arrangement shown provides a unitary cowl nose as well as a support for the leading edge 17 of the cowling and this nose portion may be anchored to the rocker boxes of the engine as at 35. Thus, by removing the fastenings at 19 and 35, the whole cowl nose may be detached from the engine as a unit, and may be withdrawn after the propeller has been removed from the shaft 12. The cowl nose 16 is shown as being integral with the main portion of the cowling 15 but if desired, the portions 15 and 16 may be separate units since it is sometimes desirable to attach the rear portion of the cowling to engine mounting structure rather than to the engine itself. The attachment of the cowl nose 16 to the engine, at points 35 is a convenient arrangement but this may be dispensed with if it is desired to divorce the cowling structure or vanes from the engine.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a power plant comprising a radial cylinder engine having a propeller forward thereof and a ring cowl embracing the engine defining at its leading edge an air entrance opening between the engine and propeller, substantially radially extending vanes across the opening extending outwardly to the cowl leading edge so curved from leading to trailing edge as to divert the tangential and radial airflow leaving the propeller to substantially axial airflow directed toward the engine cylinders, the trailing edges of said vanes being spaced ahead of the cylinders to define between the vanes and cylinders an annular air entraining cavity.

2. In a power plant comprising a radial cylinder engine having an embracing cowling defining at its forward end an air entrance opening ahead of the engine, substantially radially extending curved vanes across said opening extending from a forward point substantially co-extensive with the cowling leading edge to a point between said leading edge and the engine cylinders, whereby a free annular space for air entrainment is left between the vanes and cylinders, said vanes having a profile so curved as to change the radial and tangential airflow entering the cowling to substantially axial airflow in said space.

3. In a power plant comprising a radial cylinder engine having an embracing cowling defining at its forward end an air entrance opening ahead of the engine, substantially radially extending curved vanes across said opening extending from a forward point substantially co-extensive with the cowling leading edge to a point between said leading edge and the engine cylinders, whereby a free annular space for air entrainment is left between the vanes and cylinders, the leading edges of said vanes being angularly offset from a radial direction to receive the radial and tangential airflow entering the cowling normally thereto, and the vanes being so curved as to convert the radial and tangential airflow to axial flow as the air enters said space.

4. In a power plant comprising a radial cylinder engine having an embracing cowling defining at its forward end an air entrance opening ahead of the engine, substantially radially extending curved vanes across said opening extending from a forward point substantially co-extensive with the cowling leading edge to a point between said leading edge and the engine cylinders, whereby a free annular space for air entrainment is left between the vanes and cylinders, the leading edges of said vanes being angularly offset from a radial direction to receive the radial and tangential airflow entering the cowling normally thereto, and said vanes being so profiled that tangents to the leading edges thereof, perpendicular to the respective vane leading edges, are substantially parallel to said airflow, the vanes curving smoothly rearwardly, in such a manner that tangents thereto at their trailing edges are substantially parallel to the engine axis.

5. In a power plant comprising a radial cylinder engine having an embracing cowling defining a forward air entrance opening and a propeller forward of said opening tending to create a highly turbulent tangential airflow into the cowling, means for suppressing the tangential turbulence, while allowing of general turbulence ahead of the engine for proper cooling of the engine front, comprising deflecting vanes in the cowl nose having their leading edges substantially normal to the local tangential flow and having their profiles so curved from their leading edges rearwardly as to divert the flow from a tangential direction to a substantially axial direction, said vanes terminating ahead of the engine front whereby air discharged from the vanes is delivered to a clear space ahead of the engine cylinders.

6. In a radial cylinder aircraft power plant, a unitary ring cowling assembly for attachment thereto comprising an outer annular cowling unit, an inner dished annular member coaxial with the annular cowling unit adapted to mask the engine casing, and spoke-like vanes between the cowling unit and member permanently secured at their ends to both, said vanes having their leading edges offset from radii of the assembly and being so profiled in section as to have their forward portions slightly rearwardly angled from a plane normal to the assembly axis and their rearward portions substantially parallel to the assembly axis.

7. A unitary annular cowl assembly comprising a central annular dished member, a plurality of spoke-like vanes secured thereto and extending therefrom in offset relation to radii of the member, and a cowl annulus coaxial with the member embracing and secured to said vanes at their outer ends, the cowl annulus being inturned at that edge which embraces the dished member, and said vanes being smoothly curved so that the planes of their forward edge portions are angled rearwardly from the plane of the cowl leading edge, and the planes of their rearward edge portions are substantially parallel to the axis of the assembly.

KENNETH CAMPBELL.